United States Patent [19]
Baker

[11] 3,982,466
[45] Sept. 28, 1976

[54] COMPOUND ACTION RELEASE LINKAGE

[76] Inventor: Curtis K. Baker, 25 Tally Ho Drive, Warminster, Pa. 18974

[22] Filed: Aug. 14, 1974

[21] Appl. No.: 497,405

[52] U.S. Cl. .......................... 89/1.5 G; 244/137 R; 294/83 R
[51] Int. Cl.² .......................................... F41F 5/02
[58] Field of Search ............... 89/1.5 G; 244/137; 294/83

[56] References Cited
UNITED STATES PATENTS

| | | | |
|---|---|---|---|
| 2,394,571 | 2/1946 | Swiatecki | 89/1.5 G |
| 2,736,599 | 2/1956 | Coffing | 294/83 R |
| 3,036,852 | 5/1962 | Mullison | 89/1.5 G |
| 3,037,805 | 6/1962 | Geffner et al. | 244/137 R |
| 3,266,834 | 8/1966 | Lebovitz | 244/137 R |
| 3,677,506 | 7/1972 | LaRoe | 244/137 R |

*Primary Examiner*—Samuel W. Engle
*Assistant Examiner*—S. A. Cangialosi
*Attorney, Agent, or Firm*—R. S. Sciascia; Henry Hansen

[57] ABSTRACT

A quick release mechanism for a single hook bomb rack which is arranged so that forced overlatch or hypersensitive triggering is minimized by inherent self-adjustment of the individual members comprising the quick release mechanism.

The mechanism includes two initially vertically aligned links fixedly secured to an enclosing housing at a proximal end by a fixed pin and having an initially horizontally aligned array of three additional links extending to one side of the distal end of the two vertically aligned links. A member to be released has a tip bearing against an inner surface of the second of the horizontally aligned links and has a tension spring connected between a projecting ear of the released member and the third of the horizontally aligned links. A thrust link supplies force to the junction of the vertically aligned links causing them to toggle and assume a bent knee configuration; simultaneously the first two of the horizontally aligned links are urged to rotate upwardly as though these two links were one (by means of complementary shoulders at their abutting ends) to thereby free the member to be released. The unitary rotation of the first two of the horizontally aligned links also pulls the third of the horizontally aligned links towards the vertically aligned links and forces it to rotate upwardly also.

5 Claims, 6 Drawing Figures

COMPOUND ACTION RELEASE LINKAGE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to quick release linkage mechanisms and in particular to such mechanisms which employ a compound toggle-compound hip latch arrangement and which can be employed as the principal release element in single hook bomb release systems.

Present day quick release mechanisms which employ pins and associated links use an inordinate number of elements to achieve their function and tend to malfunction with increasing wear. As is well known, quick release requires very small motion at critically set separation points. Progressive wear at these points induces either hypersensitive triggering or forced over latch which conditions severely limit the useful life of present day quick release mechanisms.

SUMMARY OF THE INVENTION

Accordingly it is an object of this invention to provide a quick release mechanism having relatively few parts. It is a further object of this invention to provide a mechanically simple, combined function mechanism having a high degree of latched surety and reliable release. It is a further object of this invention to provide a quick release mechanism which can advantageously be employed as the principal release element of a single hook bomb release system. These and other objects of the invention are achieved as follows.

A quick release mechanism for a single hook bomb rack which is arranged so that forced overlatch or hypersensitive triggering is minimized by inherent self-adjustment of the individual members comprising the quick release mechanism.

The mechanism includes two initially vertically aligned links fixedly secured to an enclosing housing at a proximal end by a fixed pin and having an initially horizontally aligned array of three additional links extending to one side of the distal end of the two vertically aligned links. A member to be released has a tip bearing against an inner surface of the second of the horizontally aligned links and has a tension spring connected between a projecting ear of the released member and the third of the horizontally aligned links. A thrust link supplies force to the junction of the vertically aligned links causing them to toggle and assume a bent knee configuration; simultaneously the first two of the horizontally aligned links are urged to rotate upwardly as though these two links were one (by means of complementary shoulders at their abutting ends) to thereby free the member to be released. The unitary rotation of the first two of the horizontally aligned links also pulls the third of the horizontally aligned links towards the vertically aligned links and forces it to rotate upwardly also.

The released member may also be freed by means of a manual release lever which operates exclusively on the 2nd and 3rd of the horizontally aligned links. A safety cam positioned at the junction of the 2nd and 3rd horizontally aligned links prevents automatic or manual release of the member to be released.

Other objects, advantages and novel features of the invention will become apparent from the following detailed description of the invention when considered in conjunction with the accompanying drawings.

BRIEF DESCRIPTION OF THE DRAWINGS

FIG. 1b is a top view of the quick release mechanism shown in FIG. 1a;

FIG. 1c is a left side view of the quick release mechanism shown in FIG. 1a;

FIG. 1d is a detailed view of a portion of the quick release mechanism shown in FIG. 1a;

FIG. 3 shows manual unlatching of the quick release mechanism shown in FIG. 1a.

DESCRIPTION OF THE PREFERRED EMBODIMENT

Figure 1A:
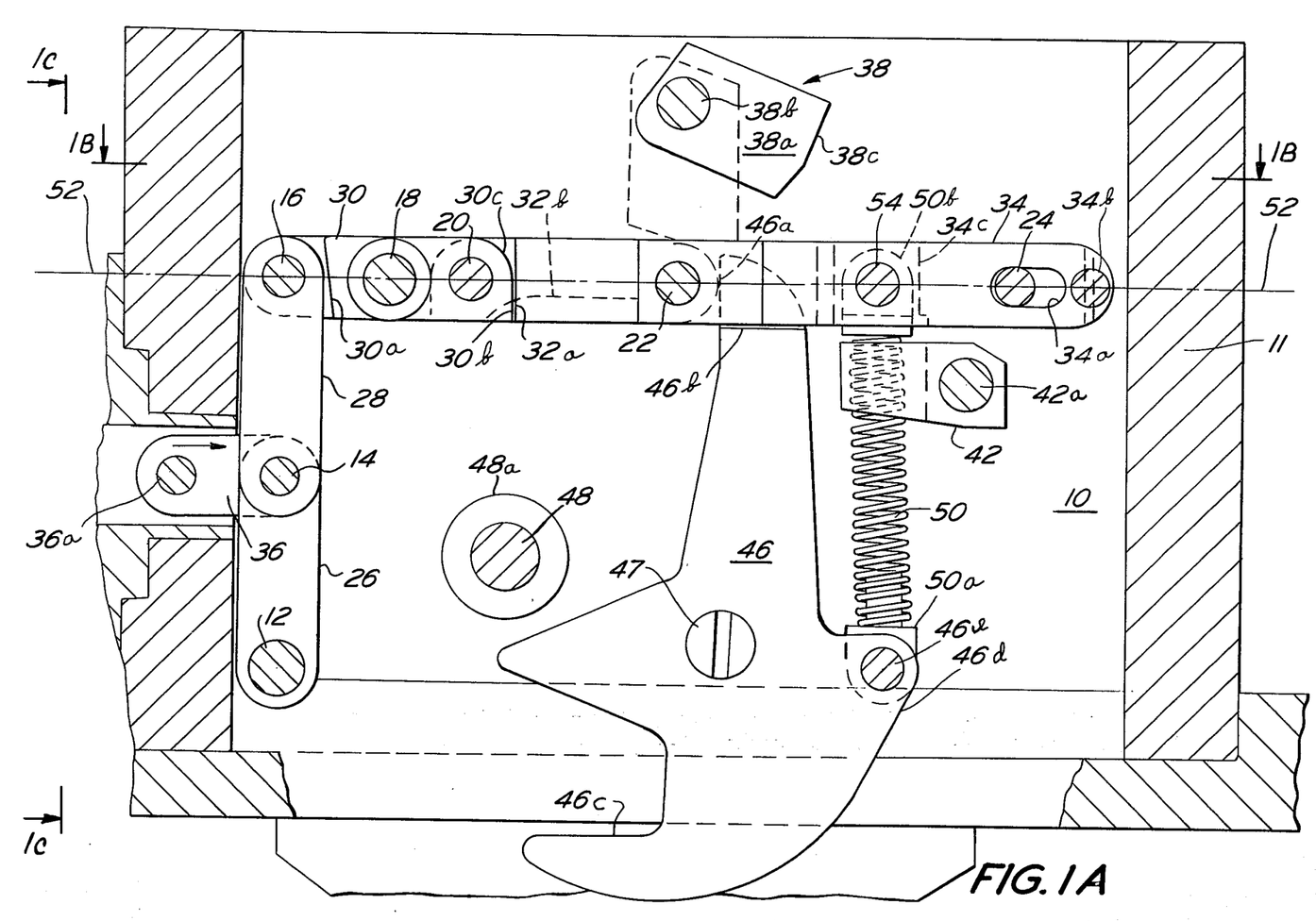
FIG. 1a is an elevation view of the quick release mechanism according to the invention in the latched or cocked position.
Figure 1B:
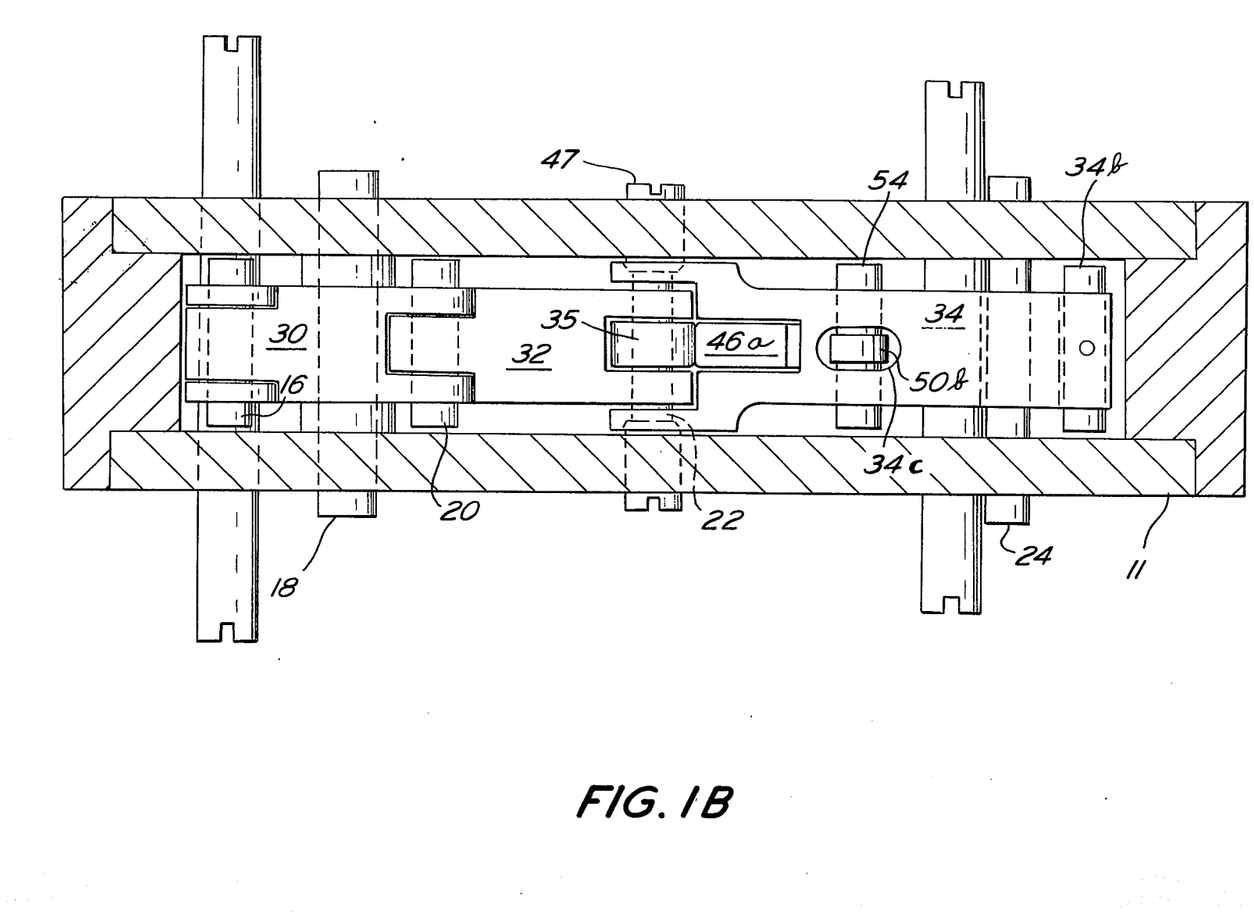
Figure 1C:
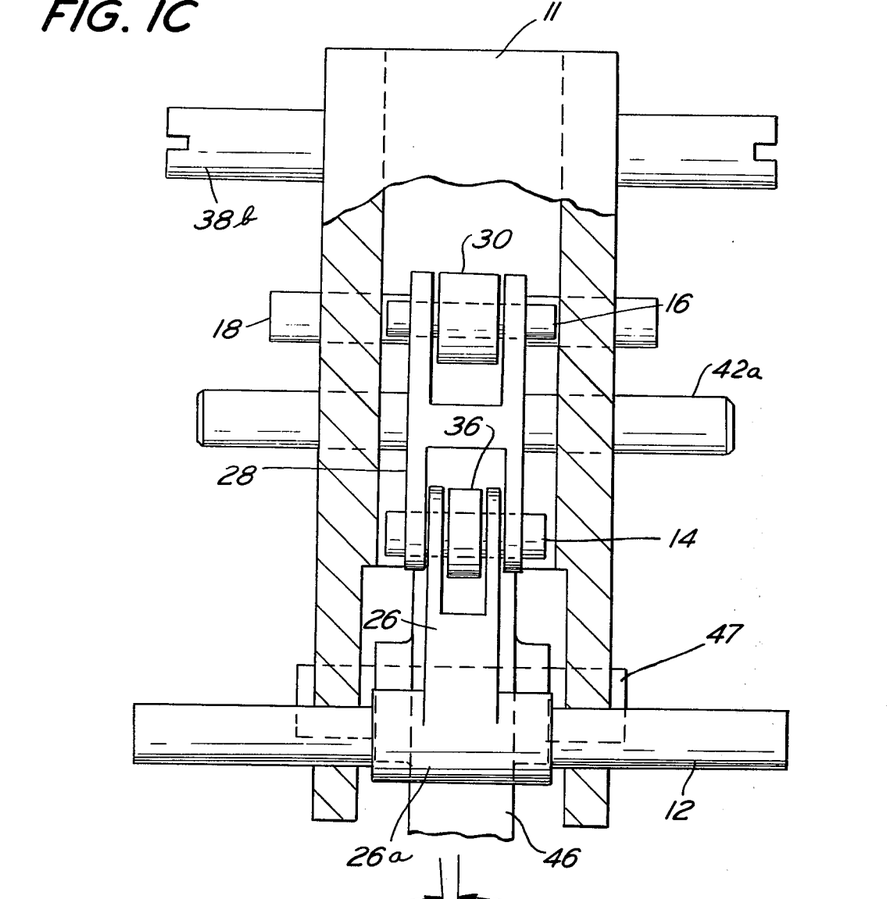

Referring to FIGS. 1a, 1b and 1c, the quick release mechanism 10 of the present invention is shown in the latched-ready or armed position. The mechanism 10 includes elongated shafts 12, 18 and 24 which are journaled for rotation in a housing 11. The shafts 12, 18, 24 securely position and guide the mechanism 10 within the housing 11 and are spatially fixed in the housing 11 with respect to each other. The mechanism 10 also includes connective pins 14, 16, 20 and 22 which provide pivot points and which move with the various links of the mechanism 10 during its operation. The immediately aforesaid shafts and pins are fabricated from any suitable material such as alloy steel (carpenter 455C) and may be secured in their respective positions by any suitable means such as cotter pins. The basic links or members of the quick release mechanism include an anchor toggle link 26, a mobile toggle link 28, a pivot link 30, a hip link 32 and a slide link 34; each of the immediately aforesaid links are made from any suitable material such as alloy steel (carpenter 455C).

As shown in FIG. 1c, the first end of the anchor toggle link 26 is provided with an elongated transversely oriented sleeve 26a which accommodates and is securely attached to the fixed shaft 12 by any suitable means such as welding; the second end of the anchor toggle link is yoked. The mobile toggle link 28 is provided with first and second ends each of which are yoked. The first ends of both the pivot link 30 and the hip link 32 are each provided with a tongue like projection having a transverse bore therethrough which accommodates a connecting pin; the second ends of both the pivot link 30 and the hip link 32 are each yoked. The first end of the slide link 34 is provided with a transverse bore which accommodates a floating centering pin 34b; the second end of the slide link 34 is yoked. (As used herein a link having a yoked end is defined as a link having two prong like projections separated by an open ended slot wherein each projection is provided with a bore axial aligned with a corresponding bore in the companion projection.)

The first end of the anchor toggle link 26, which includes the transverse sleeve 26a, is secured to the shaft 12 and rotates therewith, and the second or yoked end of the anchor toggle link 26 is operatively connected with the first end of the mobile toggle link 28 and one end of a thrust link 36 by means of connective pin 14. The second end of the mobile toggle link 28 is operatively connected with the first end of the pivot link 30 by means of a connective pin 16; the pivot link 30 is additionally mounted for rotation about the shaft 18 which reposes within a transverse bore through the pivot link 30 located near the midpoint of the pivot link 30. The second or yoked end of the pivot link 30 is operatively connected with the first end of the hip link 32 by means of a connective pin 20. The second or yoked end of the hip link 32 is operatively connected with the second or yoked end of the slide link 34 by means of a connective pin 22. (The undersurface of the hip link 32 is provided with an arcuately shaped cutout 32b which permits the counterclockwise rotation of a releasable member 46 during relatching as will be explained more fully hereinbelow.) The slide link 34 is additionally arranged to slide and rotate about the fixed shaft 24 which reposes within a slot 34a located near the first end of the slide link 34. As shown more clearly in FIG. 1b, the junction of the yoked ends of the hip link 32 and the slide link 34 is provided with a roller or sleeve 35 which is fitted over the connective pin 22 and which provides a bearing surface for the tip of a releasable lever 46 as will be explained more fully hereinbelow. A floating centering pin 34b located at the first end of the slide link 34 aids in keeping the quick release mechanism 10 centered within its enclosing housing 11 during movement of the quick release mechanism 10.

The pivot link 30 is provided with an angled shoulder 30a near its first end which permits relative rotation between the pivot link 30 and the mobile toggle link 28 through a predetermined arc. At its second or yoked end the pivot link 30 is provided with a substantially flat shoulder 30b complementary to and abutting a similar shoulder 32a provided on the first or tongue end the hip link 32. Each of the shoulders 30b, 32a is located below the common initial axis line 52 of pins 16, 18, 20, 22 and 24. During the automatic unlatching movement of the quick release mechanism 10 (as will be explained more fully hereinbelow), the shoulders 30b and 32a bear firmly against each other causing the pivot link 30 and the hip link 32 to act as a single member as they rotate in a counterclockwise direction. The pivot link shoulder 30b sweeps away from the hip link shoulder 32a along a minor arc or sweepback 30c above the axis line 52. The sweepback 30c allows the first or tongue end of the hip link 32 to rotate counterclockwise about the connective pin 20 when the releasable member 46 is relatched and when the quick release mechanism 10 is manually unlatched as will be explained more fully hereinbelow.

The quick release mechanism 10 is provided with a safety device 38 which includes a safety cam 38a mounted for rotation about a safety cam shaft 38b. A manual knob (not shown) connected to the cam shaft 38b permits the safety cam 38a to be rotated into and out of the safe-locked position shown in phantom in FIG. 1a. When the safety cam 38a is rotated clockwise into the safe-locked position, the lower surface 38c of the safety cam 38a engages the upper surface of the yoked ends of the hip link 32 and the slide link 34 at the point where said links are joined together by the connective pin 22. With the safety cam 38a in the safe-locked position, the quick release mechanism is locked in the latched or ready position and the hip link 32 cannot rotate counterclockwise and the slide link cannot rotate clockwise; hence, the quick release mechanism cannot be unlatched either automatically or manually. Therefore, accidental triggering of the quick release mechanism 10 is prevented.

The quick release mechanism is also provided with means for arresting the counterclockwise rotation of the releasable member; said means comprising a fixed shaft 48 surrounded by a removable impact absorbing sleeve 48a.

Figure 1D:
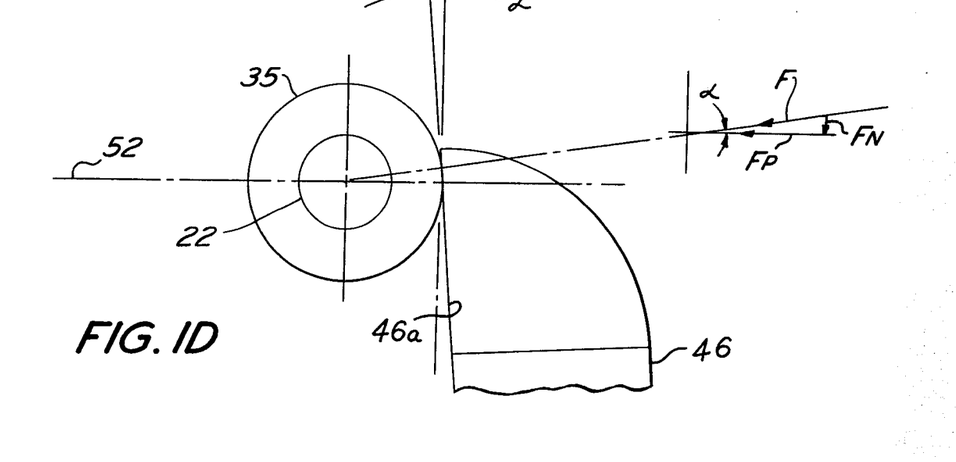

The quick release mechanism 10 is designed to reliably release a member designated herein as the releasable lever 46. In a preferred embodiment, the releasable lever 46 is a monolithic metallic structure mounted for rotation about a fixed shaft 47. At its upper end the releasable lever 46 has a tip portion 46a including a generally flat portion adapted for abutting engagement with the sleeve 35 and an arcuately shaped portion extending from said flat portion which permits the counterclockwise rotation of the releasable lever 46 through the cutout 32b on the underside of the hip link 32 during relatching of the releasable lever 46. The tip portion 46a of the releasable lever is smaller in width than the remaining portion of the releasable lever 46 and is located centrally with respect thereto so as to form shoulders 46b which serve as abutments for portions of the lower surface of the slide link 34. A bomb hook support portion comprising an open ended slot 46c which accommodates a bomb hook (not shown) is provided on one side of the lower end of the releasable lever 46. A yoke portion 46d is provided on the side opposite the slot 46c. The yoke portion 46d comprises two prong like projections having a transverse bore therethrough which accommodates a pin 46e. The pin 46e engages a terminal lug 50a attached to the first end of a tension spring 50 and swivel connects the first end of the tension spring 50 to the yoke portion 46d. The tension spring 50 passes through a yoked manual release lever 42 and terminates in a terminal lug 50b attached to its second end. By means of a pin 54 the terminal lug 50b is swivel connected to the slide link 34 within a vertically oriented transverse slot or channel 34c in the slide link 34. As shown in FIG. 1a, the tension spring 50 simultaneously pulls down on the slide link 34 (causing the slide link 34 to seat on the shoulders 46b of the releasable lever 46) and also tends to rotate the releasable lever 46 in a counter clockwise direction about the shaft 47. This tendency to rotate in the counterclockwise direction causes the tip portion 46a of the releasable lever 46 to bear against the sleeve 35 which is mounted on the connective pin 22 as shown in FIG. 1b. Hence the releasable lever 46 is slightly overcentered in the counterclockwise direction when the tip portion 46a is in abutment with the sleeve 35. Hence the force vector applied by the tip portion 46a against the sleeve 35 is not parallel to the initial axis line 52 but makes an acute angle $\alpha$ with respect thereto as shown in FIG. 1d.

The overcentered arrangement of the releasable lever 46 when in abutment with the sleeve 35 is important because such arrangement tends to compensate for the unavoidable pin wear experienced by pins 16, 18, 20 and 22 during the service life of the quick release mechanism 10. Referring to FIGS. 1a and 1d, it is clear that the force vector F applied against the sleeve 35 by the tip portion 46a can be resolved into two force vectors $F_P$ and $F_N$, parallel and normal, respectively, to the initial axis line 52.

The parallel force vector $F_P$ urges the hip link shoulder 32a and the pivot link shoulder 30b into abutment.

Hence the cumulative effect of pin wear is compensated.

As wear of pins 20 and 22 progresses they tend to droop below the axis line 52 under the influence of the parallel force vector $F_P$. The drooping action of pins 20 and 22 and their associated links provides a counter force on the pivot link 30 which further secures the mechanism 10 in the latched-ready position; that is, when pins 20 and 22 droop below the axis line 52, the pivot link 30 tends to rotate in the clockwise direction which motion tends to tension the anchor toggle link 26 and the mobile toggle link 28 and which motion also tends to abut shoulder 30a against the mobile toggle link 28. The combined effect of all of these incipient motions keeps the toggle point taut and thereby minimizes hypersensitive triggering.

The normal force vector $F_N$ impresses a downward force on pin 22. Since it is the upward movement of pin 22 to a predetermined point which eventually frees the releasable lever 46, the normal force vector $F_N$ reduces the possibility of hypersensitive triggering by urging pin 22 downwardly.

The effect of the overcentered arrangement of the releasable lever 46 is further enhanced when a bomb or other store is supported by the releasable lever 46 as can be seen by considering FIG. 1a and by noting that a bomb supported by the bomb hook support portion 46c would tend to rotate the releasable lever 46 in the counterclockwise direction about the shaft 47 thus aiding the action of the tension spring 50 as set forth above. Thus any load placed on the portion 46c would also tend to compensate for pin wear and hypersensitive triggering.

The quick release mechanism 10 is automatically triggered or unlatched by applying force at pin 14 (hereinafter the toggle point), i.e., the junction of the anchor toggle link 26, the mobile toggle link 28 and the thrust link 36. The thrust link 36 is connected to a conventional force applicator (not shown) by pin 36a. (The conventional force applicator may take the form of a releasable and relatchable spring loaded thrust member which may be operated either manually, hydraulically or electrically.) The thrust link is arranged to rotate about pin 36a. Tolerances of pin 14 and the bores in which it reposes permits a free motion space which allows a certain amount of no load toggle action at the toggle point. When secured, the force applicator by means of the thrust link 36 holds the quick release mechanism 10 in the latched ready position shown in FIG. 1a by applying a left-directed force on pin 14.

The automatic unlatching operation of the quick release mechanism will now be explained with reference to FIGS. 1a and 2. When the force applicator moves to the right, the thrust link 36 is moved to the right and pushes the pin 14 through its free motion space. (The kinetic energy gained by moving through the free motion space expends itself in shock to enhance the loaded toggle start.) The anchor toggle link 26 rotates clockwise with the shaft 12 under the impetus of the thrust link 36 motion and assumes a bent knee configuration with respect to the mobile toggle link 28.

As opening continues, the mobile toggle link 28 and the pivot link 30 approach bearing near pin 16. The pivot link 30 can still rotate about the fixed shaft 18. Continuing downward and rightward motion of the thrust link 36 carries pin 14 into momentary linear alignment with pin 12 and shaft 18. At this time a secondary toggle effect occurs. The shoulders 30b on the pivot link 30 bear against the complementary shoulders 32a of the hip link 32 causing these two links to act as a single member. Rotating in unison about shaft 18 the mated pivot link 30 and hip link 32 transfer the energy supplied by the thrust link 36 to thereby move pin 22 and the yoked end of the slide link 34 upwardly to thereby free the released lever 46. The slide link 34 pivots and slides about fixed shaft 24. In so doing, the slide link 34 lengthens the tension spring 50 whose spring force in turn assists the counterclockwise rotation of the released lever 46 about the shaft 47. (It is clear that a bomb or other store supported by hook support portion 46c similarly assists rotation of the releasable lever 46 about the shaft 47. Hence reliable release of the releasable lever 46 is further enhanced.) A stop 48a firmly affixed to the housing 11 enclosing the quick release mechanism 10 halts the released lever 46 in its counterclockwise rotation about the shaft 47. Thereafter the quick release mechanism 10 remains in the position shown in FIG. 2 until it is relatched as explained hereinbelow.

Figure 3:
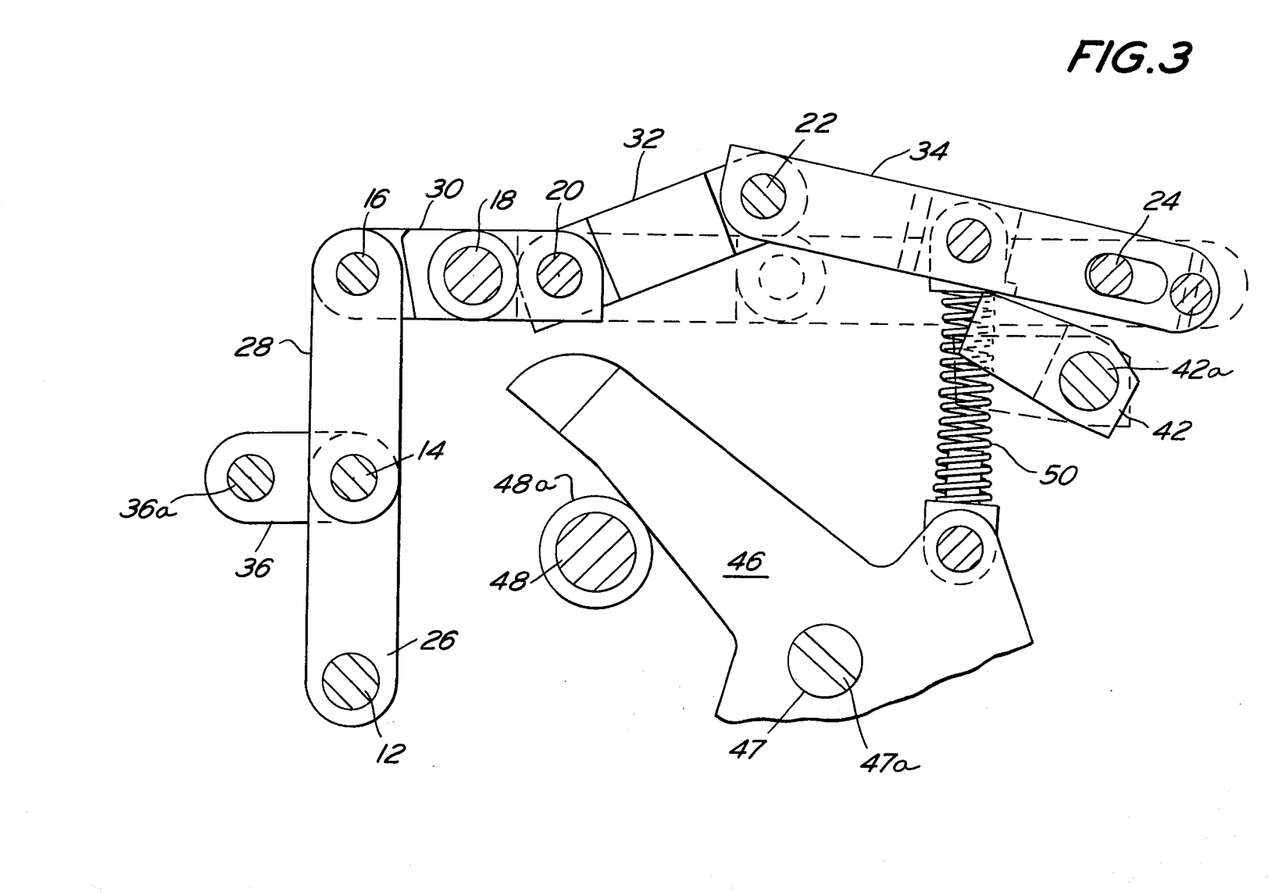

With reference to FIG. 3 the methods of resetting the quick release mechanism 10 and of relatching the releasable lever 46 and the method of manually unlatching the releasable lever 46 will now be set forth.

Resetting of the quick release mechanism is accomplished as follows. The force applicator (not shown) moves a predetermined distance to the left carrying with it the thrust link 36 which bears against pin 14 thereby moving pin 14 to the left which motion vertically aligns the anchor toggle link 26 and mobile toggle link 28. (It is clear from FIGS. 2 and 3 that the anchor toggle link 26 and the attached shaft 12 rotate counterclockwise during the resetting phase.) The thrust link 36 is maintained in the latched or reset position by the force applicator and maintains the anchor toggle link 26 and the mobile toggle link 28 in the vertical latched or reset position. When the anchor toggle link 26 and the mobile toggle link 28 are in the latched or reset position these two links and the pivot link 30 assume the position shown by solid lines in FIG. 3, at the same time, the hip link 32 and slide link 34 assume the position shown by phantom lines in FIG. 3.

Relatching of the releasable lever 46 is accomplished as follows. Once the anchor toggle link 26 and the mobile toggle link 28 are in vertical alignment, the releasable lever 46 may be relatched into abutment with the sleeve 35. The releasable lever 46 is rotated clockwise away from the stop 48 by any suitable means or by means of a screw driver inserted into a slot 47a provided in the shaft 47. With continuing clockwise rotation the tip portion 46a of the releasable lever 46 passes through the arcuate cutout 32b provided on the underside of the hip link 32. Eventually the curved surface of the tip portion 46a engages the left side of the sleeve and moves the sleeve 35 and pin 22 upwardly causing the hip link 32 to rotate counterclockwise about the pin 20 and causing the slide link 34 to slide over and to rotate clockwise about the shaft 24. As the tip portion 46a engages and forces the sleeve 35 upwardly, the hip link 32 and slide link 34 assume a typical position as shown by the solid lines in FIG. 3. With continuing counterclockwise rotation of the releasable lever 46, its tip portion 46a moves to the right of the sleeve 35 which permits the sleeve 35 to move downwardly under the influence of the force exerted in it by the tension spring 50 via the slide link 34. (It is to be noted that as the releasable member 46 is rotated clockwise away from the stop 48, the tension spring is stretched between pins 46e and pin 54; this stretching of the tension spring 50 impresses a downward force on the slide link 34 and on sleeve 35 which is attached to the slide link by pin 22. It is this downward force of the tension spring 50 which moves the sleeve 35 and pin 22 downward after the tip portion 46a of the releasable lever passes to the right of the sleeve and which reseats the lower surface of the slide link 34 on the shoulders 46b of the releasable lever 46.)

Manual release of the releasable lever 46 is accomplished as follows. The releasable lever 46 of the quick release mechanism 10 may be manually freed without disturbing the latched toggle point, i.e., without moving the anchor toggle link 26 and the mobile toggle link 28 from their vertically aligned position. With further reference to FIG. 3, when the manual release lever 42 is rotated clockwise about the shaft 42a to the position shown by solid lines in FIG. 3 it eventually engages the undersurface of the slide link 34 and rotates the slide link about shaft 24. Continuing clockwise rotation of the slide link 34 (under the influence of the manual release lever 42) moves the sleeve 35 upwardly and forces the hip link 32 to rotate counterclockwise about the pin 20. When the sleeve 35 has been raised a sufficient distance the tip portion 46a of the releasable lever 46 clears the sleeve 35 and rotates counterclockwise about the shaft 47 under the influence of the tension spring 50. It is to be noted that only the slide link 34 and hip link 22 are moved during manual unlatching of the releasable lever.

Many modifications of the present invention will occur to those skilled in the art in view of the foregoing. For example, instead of fixedly mounting the sleeve 26a on the shaft 12, the anchor toggle link 26 may be arranged to freely rotate on an immovable shaft 12. When so arranged the mechanism 10 is conveniently reset by means of the thrust link 36 only. This method of reset is to be contrasted with the method of reset when the sleeve 26a is fixedly secured to a shaft 12 journaled for rotation in the housing 11, i.e., when the shaft 12 and anchor toggle link 26 act in unitary fashion; in this case reset of the mechanism 10 is most conveniently accomplished by applying a counterclockwise torque to the shaft 12 or movement of the thrust link 36 to the left or both.

Figure 2:
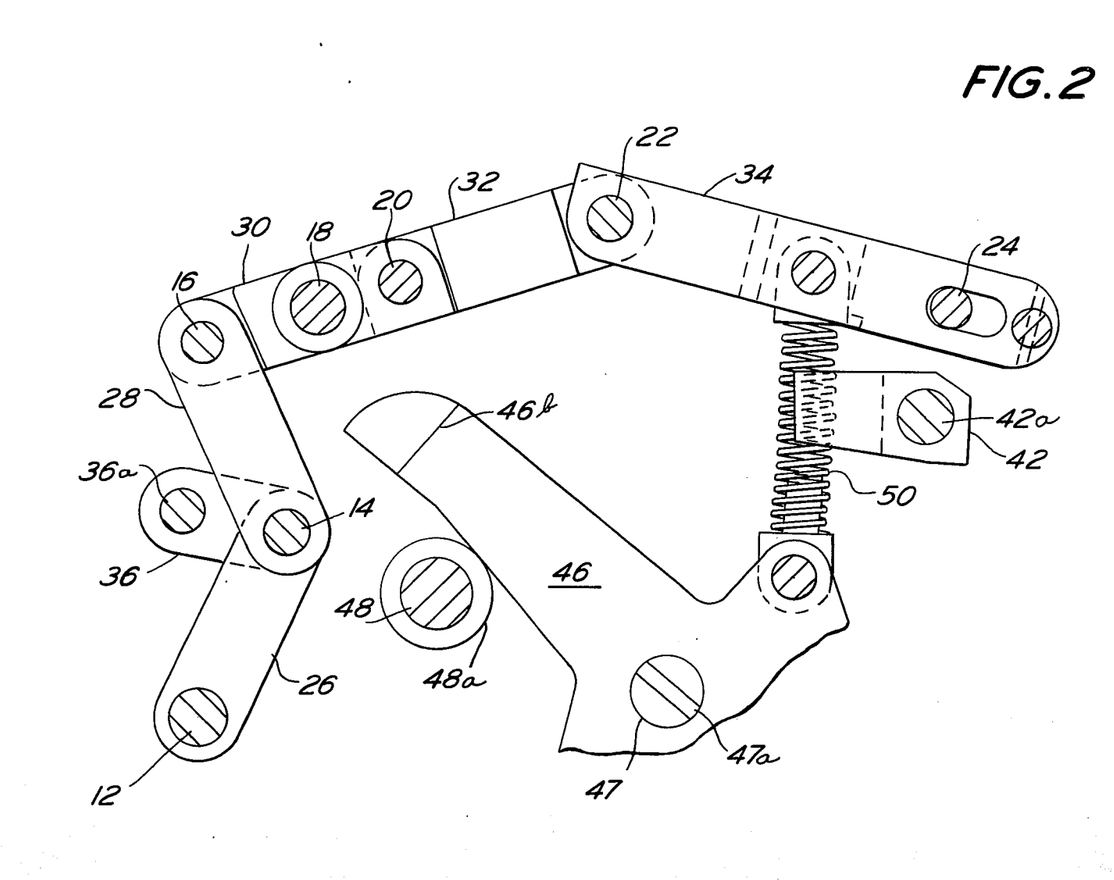
FIG. 2 is an elevation view of the quick release mechanism according to the invention in the unlatched position.

In FIGS. 1a and 2, the shoulders 30b and 32a are shown slightly separated for clarity of illustration. It is to be understood that shoulders 30b and 32a are actually urged into abutting engagement by means of the force exerted on the releasable lever 46 by the tension spring 50.

The conventional force applicator may also take the form of a shaft connected at one of its ends to the thrust link by pin 36a; the other end of the shaft may be provided with a knob to facilitate manual operation and movement of the thrust link.

Obviously many modifications and variations of the present invention are possible in the light of the above teachings. It is therefore to be understood that within the scope of the appended claims the invention may be practiced otherwise than as specifically described.

I claim:

1. A release mechanism comprising:
 a support means;
 a releasable member pivotally connected to said support means for movement to and from a latched position;
 a first link pivotally connected at its proximal end to said support means to thereby form a first spatially fixed axis of rotation;
 a second link pivotally connected at its proximal end to the distal end of said first link;
 a thrust link pivotally connected to said first and second links for simultaneously urging said first and second links to and from a toggle position;
 a third link pivotally connected at its proximal end to the distal end of said second link, said third link having a shoulder at its distal end;
 said third link additionally pivotally connected intermediate its ends to said support means to thereby define a second axis of rotation spatially fixed with respect to said first axis of rotation;
 said first and second axes of rotation lying in a plane making an acute angle with a vertical plane;
 a fourth link pivotally connected at its proximal end to the distal end of said third link, said fourth link having a shoulder at its proximal end;
 a fifth link pivotally and slidably connected to said support means to thereby define a third axis of rotation coplanar with said second axis of rotation;
 connective means for pivotally connecting said fourth link and said fifth link, said connective means including a surface for retaining said releasable member in said latched position; and
 spring means pivotally connected to said releasable member and to said fifth link for urging said releasable member from said latched position, for urging said releasable member into abutment with said connective means surface, and for urging said third link shoulder and said fourth link shoulder into abutment.

2. A release mechanism comprising:
 a thrust member;
 a first shaft having a first axis of rotation;
 a first member pivotally mounted at its proximal end on said first shaft;
 a second member pivotally connected at its proximal end to said thrust member and pivotally connected to the distal end of said first member;
 a third member pivotally connected at its proximal end to the distal end of said second member;
 a second shaft spatially fixed with respect to said first shaft and having a second axis or rotation;
 said first and second axes of rotation lying in a plane making an acute angle with a vertical plane;
 said third member rotatably secured intermediate its ends on said second shaft;
 a fourth member pivotally connected at its proximal end to the distal end of said third member;
 a fifth member pivotally connnected at its proximal end to the distal end of said fourth member;
 a third shaft spatially fixed with respect to said first and second shafts and having a third axis of rotation coplanar with said second axis of rotation;
 said fifth member pivotally and slidably mounted at its distal end on said third shaft;
 said fifth member having a first transverse channel and a second transverse channel;
 a fourth shaft spatially fixed with respect to said first, second and third shafts;
 a releasable member having a tip end and a hook end and pivotally mounted intermediate said tip end and said hook end on said fourth shaft whereby a portion of said tip end reposes within said first transverse channel and bears against one side thereof; and a tension spring having a first end secured within said second transverse channel and having a second end secured to said releasable member intermediate said tip end and said hook end.

3. A release mechanism according to claim 2 wherein:

said first and second members are initially in substantial longitudinal alignment with respect to each other;

said third, fourth, and fifth members are initially in substantial longitudinal alignment with respect to each other and initially substantially transversely positioned to one side of and with respect to said longitudinally aligned first and second members; and said thrust member is initially transversely positioned to the other side of said longitudinally aligned first and second members.

4. A release mechanism according to claim 3 further including:

a fifth shaft spatially fixed with respect to said third shaft; and a lever pivotally mounted at its proximal end on said fifth shaft and having a yoked distal end said yoked end engaging said fifth member when said lever is pivoted in a predetermined direction.

5. A release mechanism according to claim 3 further including:

a stop member spatially fixed with respect to said first shaft and extending through an arc path followed by said releasable member.

* * * * *